Patented Aug. 15, 1939

2,169,246

UNITED STATES PATENT OFFICE 2,169,246

BUTYL ACETONE FERMENTATION PROCESS

Frank M. Hildebrandt, Baltimore, and Norris M. Erb, Riviera Beach, Md., assignors to U. S. Industrial Alcohol Co., New York, N. Y., a corporation of West Virginia No Drawing. Application July 15, 1937, Serial No. 153,784

6 Claims. (Cl. 195—44)

This invention relates to a process for the production of solvents, principally butyl alcohol, and acetone, from molasses, more especially cane molasses, such as is produced from the manufacture of cane sugar and which is known as blackstrap.

A number of processes have been proposed for butyl-acetone fermentation of blackstrap molasses, since this material is cheap and readily obtainable, but apparently none of these processes has been commercially successful. In order for a butyl-acetone fermentation of molasses to be certain in its operation commercially, it is necessary to discover an organism capable of functioning to produce the desired results in a molasses mash, and also to devise treatments for the mash which will overcome its unfavorable characteristics, thus enabling the organism to utilize the molasses nutrients. The behavior of a particular organism in a commercial and practical sense can be determined only after sufficient experience in its use. We employ an organism, previously unknown and not previously isolated as far as we are aware and which we have termed *Clostridium celerifactor*, which has proved to be effective in commercial scale operations.

It should be stated that not only are the nature and properties of the organism important, but that factors and conditions affecting the carrying out of the process have a practical influence.

While a number of these conditions and steps which we have found to be beneficial are not new in themselves, it is our belief that the particular combination which we have embodied in our process gives definite commercial advantages.

A detailed description of the organism, *Clostridium celerifactor*, which we employ, now follows:

*Form.*—Motile, spore-forming rod.

*Size.*—About 1 micron in diameter by 3 to 10 microns in length. Average length about 6 microns. (As is true of all bacteria, the size varies somewhat with age of culture, type of medium, and other conditions of growth.)

*Staining reactions.*—Gram negative; blue granules with iodine; stains readily with ordinary bacteriological dyes such as methylene blue and gentian violet.

*Endospores.*—Oval in shape; 1.5 x 2.5 microns in size.

*Position of spores in cell.*—Subterminal to central.

*Sporangia.*—Cells containing spores usually not markedly swollen. Sometimes the sporangia are swollen, giving rise to club-like and spindle-shaped cells.

*Relation to oxygen.*—Anaerobic. (This organism would be classed as an obligate anaerobe according to ordinary laboratory criteria. There is no clear line of demarcation between a strict anaerobe and one which might be termed weakly facultative.)

*Agar slant culture.*—No growth.

*Liquid media.*—Tendency toward flocculent growth.

*Gelatin.*—Not liquefied.

*Milk.*—Acid produced; may or may not be curdled; casein not digested.

*Indol.*—Not produced.

*Ammonia.*—Produced from "peptone".

*Hydrogen sulphide.*—Not produced from "peptone" or proteins of oatmeal.

*Nitrates.*—Reduced to nitrites.

*Sulphates.*—Not reduced to hydrogen sulphide.

*Synthetic media.*—Growth takes place in synthetic media containing inorganic nitrogen, with glucose as the source of energy.

*Nitrogen-free media.*—No growth.

*Limiting acidity for growth.*—About pH 3.9.

*Limiting alkalinity for growth.*—About pH 8.0.

*Maximum temperature for growth.*—About 42° C. (Growth at 41° C.; no growth at 43° C.)

*Minimum temperature for growth.*—About 15° C.

*Optimum temperature for growth.*—32.-36° C.

*Limiting glucose concentration.*—About 16%. (Growth at 15%; no growth at 17%.)

*Glucose broth.*—Acid, gas and solvents, complete utilization of sugar.

*Maltose broth.*—Acid and gas.

*Sucrose broth.*—Acid and gas and solvents, incomplete utilization of the sugar.

*Lactose broth.*—Acid and gas.

*Dextrin broth.*—Acid and gas.

*Starch broth.*—Acid and gas.

*Glycerol broth.*—No acid, no gas.

*Mannitol broth.*—Acid and gas.

*Raffinose broth.*—Acid and gas.

*Corn meal mash.*—No solvents produced; not digested.

*Calcium lactate broth.*—No solvents produced.

*Unhydrolyzed molasses mash.*—Solvents production poor.

*Hydrolyzed molasses mash.*—Solvents production good.

*Ratio of solvents produced in hydrolyzed molasses mash.*—About 60% butyl, 38% acetone, 2% ethyl.

The following example will illustrate our present preferred mode of carrying out the fermentation:

800 pounds of blackstrap molasses, of about 50% sugar content, is placed in a steel pressure vessel and diluted with water to a brix of 30°. To this we add about 1.2 gallons of concentrated sulphuric acid and one gallon of autolyzed yeast containing about ¾ pound of yeast solids. The mixture is then heated by direct steaming, the pressure being allowed to come to 15 pounds per square inch. This pressure is held for a period of approximately 30 minutes which is sufficient to invert the sucrose and completely sterilize the molasses containing the yeast autolyzate. In the meantime we have placed in the fermentation vessel which has previously been steam sterilized, 900 gallons of water, also sterilized by any desired method. We find a heavy chlorine treatment suitable for the water, using for this purpose sufficient chlorine to give 15–30 ppm. of residual chlorine. In a third vessel we prepare a slurry of chalk containing about 20 pounds of the chalk and sufficient water to make the slurry flow readily. This is also steam sterilized. Just before we are ready to discharge the inverted, sterile molasses into the final fermentation vessel containing the sterile water, we add to the water 9.0 pounds of aqua ammonia. The molasses concentrate is then pumped through a suitable cooler into the sterile ammoniated water, the chalk slurry is added and the mash thus prepared is ready for seeding. It is desirable to add the ammonia first and then the chalk in order that an excess of uncombined chalk should be present to act as a buffering material during the fermentation. The following tabulation gives the limits within which we hold certain important factors in the case of this final mash:

| | |
|---|---|
| Temperature °F | 90 –95 |
| Brix ° | 8 –10 |
| Sugar, grams per 100 cc | 4.5– 6.0 |
| pH | 5.5– 6.5 |
| Volume of seed Per cent | 1.0– 4.0 |

The above example is taken from actual plant operation on a single type of molasses. Obviously, the quantities of materials and details of operation may vary somewhat with the raw materials.

The seed for the above final fermentation is built up in several stages in the plant in a molasses solution essentially like the above except that it is somewhat more dilute.

A feature of the process which we consider important and novel is the method of adding the seed to the final stage. The seed addition is carried out in such a manner that the seed does not mix with the mash but lies on the upper surface in an undisturbed layer. This may be accomplished by allowing the seed mash to flow into the fermenter through a pipe placed near the mash surface and so arranged that the inflowing seed is discharged parallel to the upper surface of the mash. By layering the seed, in an undisturbed mass on the surface in this manner, a dense population of organisms is active in the upper portion of the mash and this seed body gradually works through the entire mass of liquid in the fermenter without "dilution". Laboratory experiments carried out in flasks have shown, if two flasks are set up in one of which the seed is placed as noted above and in the other it is mixed in with the entire mass, that the yields are lowered in the mixed flask. If the amount of seed is reduced sufficiently, the mixed flask may not ferment at all. This feature of the process has been developed in order to permit the communal action of the bacteria to come into play.

For the purpose of further disclosure, we wish to mention certain factors which our experience leads us to believe should be taken into account in the practical use of the process. Since, however, the present state of knowledge of the activities of micro-organisms and their employment industrially are very largely an empirical matter, we desire that the explanations given be taken for guidance rather than as necessary limitations.

The organism Clostridium celerifactor is readily overgrown by acid producing types, hence practical sterility of the medium is necessary. This is probably true of butyl acetone organisms generally. We believe it to be advantageous to secure sterility by heating the molasses in a relatively concentrated condition, and adding this sterile sugar-containing material to sterile water. Heating in an acidified condition makes sterilization more certain and reduces the tendency of the sugars to decompose during sterilization. In the case of our organism, acid treatment is necessary also because a useful yield of solvents can only be obtained from invert sugar.

The organism is an anaerobe and although the traces of oxygen found in the mashes do not markedly interfere with its activity, another well-known peculiarity of anaerobic forms does come into play. This is their so-called "communal action", which means that the bacteria are normal only when there is a dense population. Hence, our special method of adding the seed to the final fermentation stage.

As is known, blackstrap molasses is deficient in organic matter required for the organisms, and nutriment should be added. We find the addition to the mash of autolyzed yeast and ammonia or ammonium salts to be effective for the purpose. The yeast supplies the necessary nitrogen compounds, while the ammonia acts mainly as a metabolic stimulant. When these ingredients are used, it is desirable to employ an amount of autolyzed yeast which is equivalent to not less than 0.1 pound dry yeast solids per 100 pounds of sugar in the mash, and an amount of ammonia not less than 0.5 pound of $NH_3$ per 100 pounds of sugar.

The molasses is high in minerals and contains toxic break-down products of sugars. This latter condition is aggravated by the sterilization of the molasses with heat. It is our experience that a commercial plant fermentation must be rapid in order to succeed, and that unless fermentation is rapid and a large population of organisms is produced the communal action associated with normal functioning of the bacteria will not come into play. The necessity for a rapid fermentation also grows out of the fact that it is difficult to get absolute sterility in the large volumes of mash and complicated apparatus of a plant set-up. These minute infections, so difficult to eliminate, are of no practical significance if the butyl fermentation is rapid and vigorous, but if it is slow, they may readily cause failure.

We have selected an organism which is a rapid fermenter, not unduly sensitive to oxygen, is capable of fermenting sugars, not requiring starch or grain, and which is capable of acting effectively in an inverted blackstrap molasses mash. The rapidity of fermentation is promoted by the manner of seeding to take best advantage of the communal action of the organisms, by the addition of suitable ingredients to stimulate the growth and vigor of the organisms, and by the other preferred steps and conditions herein described.

It will be understood by those skilled in the art that it is necessary to control the acidity of the mash. This may be done by the addition of inorganic neutralizers, one of which is ammonia. This is not new, but we consider it highly desirable that the neutralizers do not come into contact with hot molasses, since alkalis are known to break down sugar, especially in the presence of iron. This precaution, when carried out in conjunction with sterilization and inversion of the mash in an acidified state, reduces the sugar decomposition to a minimum. Alkali decomposition of the sugars may make the mash toxic and cause failure.

The organism has been isolated by well-known bacteriological methods, from soil. The type seems to be widely distributed. As a growing medium for culture, it is advantageous to use a molasses mash, since this procedure eliminates organisms or individuals unadapted to the process.

We claim:

1. The process of producing solvents, principally butyl alcohol and acetone, by fermentation, which comprises seeding a sterilized, inverted molasses mash with a culture of the herein described micro-organism *Clostridium celerifactor*, and carrying out the fermentation.

2. The process of claim 1, in which the mash is prepared by adding to a solution of molasses, autolyzed yeast and sulfuric acid, heating this acidified material to invert the sucrose and sterilize the material, then diluting with sterile water containing ammonia and adding sterile chalk.

3. The process of claim 1, in which the mash is prepared by adding to a solution of molasses, autolyzed yeast and sulfuric acid, heating this acidified material to invert the sucrose and sterilize the material, then diluting with sterile water containing ammonia and adding sterile chalk, and in which the amount of autolyzed yeast employed is equivalent to not less than 0.1 pounds of dry yeast solids per 100 pounds of sugar in the mash, and the ammonia is not less than 0.5 pounds of $NH_3$ per 100 pounds of sugar.

4. The process of producing solvents, principally butyl alcohol and acetone, by fermentation, which comprises preparing a sterilized, inverted molasses mash in such manner that the molasses is heated in an acidified condition, subsequently adding a neutralizing agent to control the acidity of the mash, seeding the mash with a culture of the herein described micro-organism *Clostridium celerifactor*, and carrying out the fermentation.

5. In the process of producing solvents, principally butyl alcohol and acetone, by fermentation, as set forth in claim 4, the step which consists in applying the seed culture quietly on top of the mash, so that the seed culture forms an undisturbed layer on the mash surface.

6. The process of claim 1 of producing solvents, principally butyl alcohol and acetone, by fermentation, in which the mash is prepared by adding to a solution of molasses, autolyzed yeast and sulfuric acid, heating this acidified material to invert the sucrose and sterilize the material, then diluting with sterile water containing ammonia and adding sterile chalk, and in which, further, the seed culture is applied quietly on top of the mash, so that the seed culture forms an undisturbed layer on the mash surface.

FRANK M. HILDEBRANDT.
NORRIS M. ERB.